US008688699B2

(12) United States Patent
Eggink et al.

(10) Patent No.: US 8,688,699 B2
(45) Date of Patent: Apr. 1, 2014

(54) METHOD FOR CONTENT RECOMMENDATION

(75) Inventors: Jana Eggink, Stuttgart (DE); Thomas Kemp, Esslingen (DE); Wilhelm Hagg, Korb (DE); Taufan Zimmer, Stuttgart (DE); Tomasz Feduszczak, Libourne (FR)

(73) Assignee: SONY Deutschland GmbH, Berlin (DE)

( * ) Notice: Subject to any disclaimer, the term of this patent is extended or adjusted under 35 U.S.C. 154(b) by 41 days.

(21) Appl. No.: 13/092,681

(22) Filed: Apr. 22, 2011

(65) Prior Publication Data

US 2011/0196865 A1    Aug. 11, 2011

Related U.S. Application Data

(63) Continuation of application No. 12/025,425, filed on Feb. 4, 2008, now Pat. No. 7,958,119.

(30) Foreign Application Priority Data

Mar. 31, 2007   (EP) .................... 07 006 766

(51) Int. Cl.
*G06F 7/00* (2006.01)
*G06F 17/30* (2006.01)

(52) U.S. Cl.
USPC ............................ 707/732; 707/733; 707/748

(58) Field of Classification Search
USPC ......... 707/732, 733, 734, 738, 748, 749, 913, 707/916
See application file for complete search history.

(56) References Cited

U.S. PATENT DOCUMENTS

| | | | |
|---|---|---|---|
| 5,465,113 A | 11/1995 | Gilboy | |
| 5,616,876 A | 4/1997 | Cluts | |
| 5,724,567 A | 3/1998 | Rose et al. | |
| 5,872,850 A | 2/1999 | Klein et al. | |
| 6,041,311 A * | 3/2000 | Chislenko et al. | 707/999.102 |
| 6,587,127 B1 | 7/2003 | Leeke et al. | |
| 7,403,910 B1 | 7/2008 | Hastings et al. | |
| 7,617,127 B2 | 11/2009 | Hunt et al. | |
| 7,962,482 B2 * | 6/2011 | Handman et al. | 707/733 |
| 2002/0059094 A1 * | 5/2002 | Hosea et al. | 705/10 |
| 2002/0178448 A1 | 11/2002 | Te Kiefte et al. | |
| 2004/0040040 A1 | 2/2004 | Danker et al. | |

(Continued)

FOREIGN PATENT DOCUMENTS

| | | |
|---|---|---|
| CN | 1629884 A | 6/2005 |
| CN | 1799052 A | 7/2006 |

(Continued)

OTHER PUBLICATIONS

Office Action issued Mar. 26, 2012 in Chinese Application No. 200810088482.5 (With English Translation).

(Continued)

*Primary Examiner* — Vincent F Boccio
(74) *Attorney, Agent, or Firm* — Oblon, Spivak, McClelland, Maier & Neustadt, L.L.P.

(57) ABSTRACT

A method for content recommendation for a user, wherein a song or a video is recommended to the user and a confidence measure is determined for the recommended song. The confidence measure is displayed to the user, so the user may get more confidence into the recommendation of the system.

25 Claims, 9 Drawing Sheets

(56) References Cited

U.S. PATENT DOCUMENTS

| | | | |
|---|---|---|---|
| 2004/0131333 A1 | 7/2004 | Fung et al. | |
| 2004/0254957 A1* | 12/2004 | Hyotyniemi et al. | 707/104.1 |
| 2006/0112087 A1 | 5/2006 | Smyth et al. | |
| 2006/0206478 A1 | 9/2006 | Glaser et al. | |
| 2006/0212444 A1 | 9/2006 | Handman et al. | |
| 2006/0293909 A1* | 12/2006 | Miyajima et al. | 705/1 |

FOREIGN PATENT DOCUMENTS

| | | | |
|---|---|---|---|
| CN | 1799052 | A | 7/2006 |
| EP | 1 484 693 | A1 | 12/2004 |
| JP | 11-509019 | A | 8/1999 |
| JP | 2002-520739 | A | 7/2002 |
| JP | 2004-518372 | A | 6/2004 |
| JP | 2004-194344 | A | 7/2004 |
| JP | 2005-57713 | A | 3/2005 |
| JP | 2005-346347 | A | 12/2005 |
| JP | 2006-339794 | A | 12/2006 |
| JP | 2007-11901 | A | 1/2007 |
| WO | WO 95/29452 | | 11/1995 |
| WO | WO 00/04464 | | 1/2000 |
| WO | WO 03/047242 | | 6/2003 |
| WO | WO 2004/114154 | | 12/2004 |

OTHER PUBLICATIONS

Hideo Shimazu, "ExpertClerk: A Conversational Case-Based Reasoning Tool for Developing Salesclerk Agents in E-Commerce Webshops", Artificial Intelligence Review, XP-002299768, vol. 18, 2002, pp. 223-244.

Lorraine Mc Ginty, et al., "Comparison-Based Recommendation", Internet Citation, XP-002299769, 2002, 15 Pages, http://citeseer.ist.psu.edu/625808.html, (retrieved Oct. 5, 2004).

Office Action issued Nov. 16, 2011 in China Application No. 200810088482.5.

Extended European Search Report issued Jun. 15, 2011, in Patent Application No. 11002698.6.

Chinese Office Action issued Apr. 26, 2011, in Patent Application No. 200810088482.5 (with English-language translation).

Office Action issued Jul. 10, 2012, in Japanese Patent Application No. 2008-091782 with English summary translation.

Office Action issued Jul. 25, 2012, in Chinese Patent Application No. 200810088482.5 with English translation.

Extended European Search Report dated Jun. 18, 2007, in European Patent Application No. 07006766.5.

European Office Action dated Feb. 18, 2013, in European Patent Application No. 07006766.5-1952.

European Office Action dated Feb. 28, 2013, in European Patent Application No. 11002698.6-1952.

* cited by examiner

High Confidence Value

Low Confidence Value

Low Confidence Value

METHOD FOR CONTENT RECOMMENDATION

CROSS-REFERENCE TO RELATED APPLICATIONS

This application is a continuation application of U.S. application Ser. No. 12/025,425, filed Feb. 4, 2008, which is based on European application Serial No. 07 006 765.5, filed Mar. 31, 2007, the entire contents of which are incorporated hereinto by reference.

The invention relates to a method and device for content recommendation. Further, the invention relates to a graphical user interface.

BACKGROUND OF INVENTION

Today, large databases of content items, e.g. music databases comprising one million songs or more or video databases comprising several thousands of videos are widely available. Users, however, often have difficulties browsing such large databases and finding e.g. a piece of music they like to listen to. Thus, there is a need for a method for content recommendation that automatically selects one or more content items for a user, wherein the selected content item(s) should match the user's taste as close as possible.

SUMMARY OF THE INVENTION

It is an object of the invention to provide a method and device for content recommendation enabling a high rate of user satisfaction. Further, it is an object of the invention to provide a respective graphical user interface.

The object is solved by a method, device and graphical user interface according to claims 1, 11 and 13, respectively.

In the following, embodiments of the invention are described at hand of the drawings and ensuing description.

DETAILED DESCRIPTION

Figure 1:
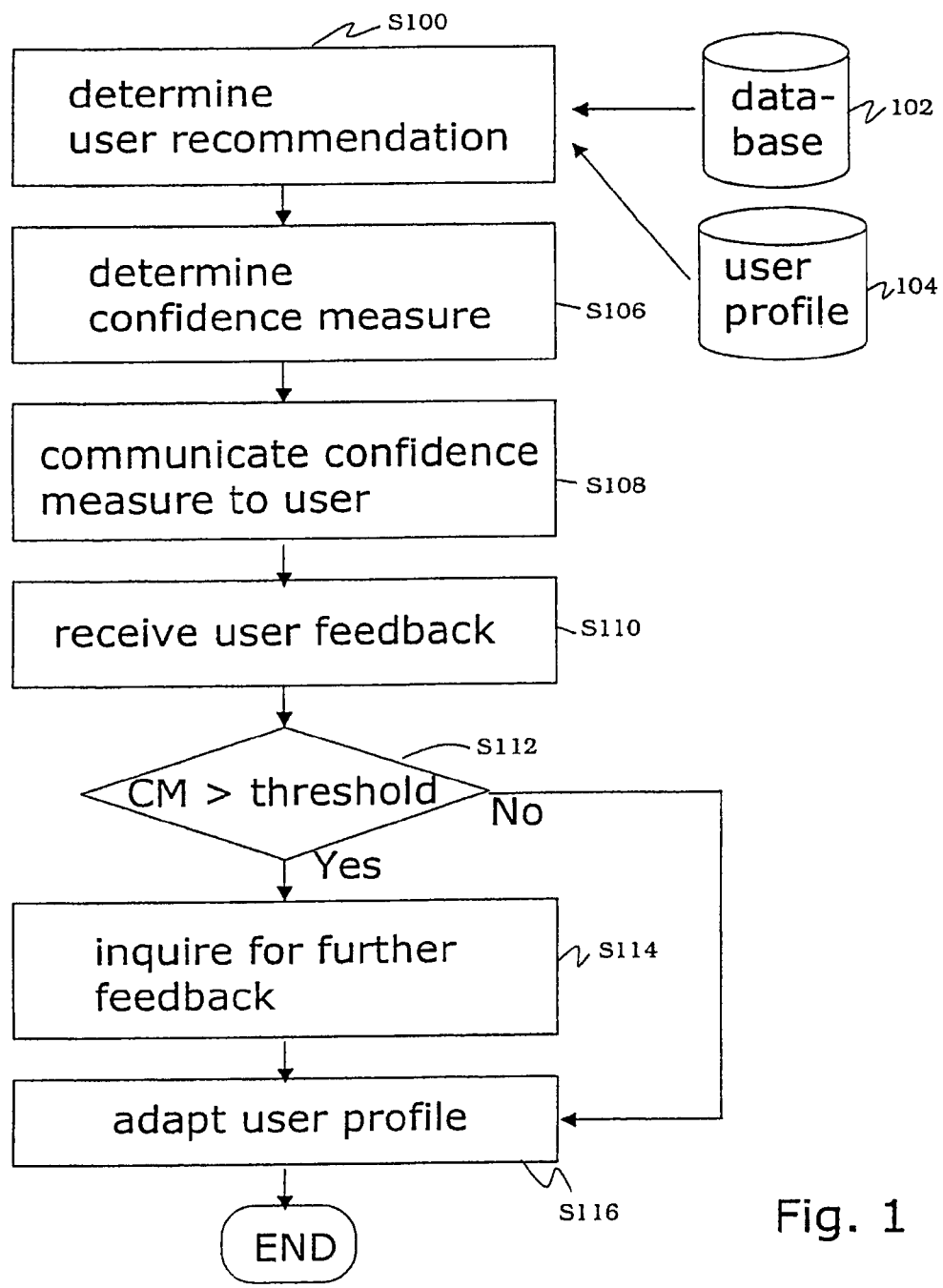
FIG. 1 shows possible steps of a method for content recommendation.

In the following, embodiments of the method and device for content recommendation are described. It should be noted that the described embodiments may be combined in any way, i.e. features described in connection with a certain embodiment may be combined with features described in connection with another embodiment.

In an embodiment, the method for content recommendation may comprise determining a content recommendation from a database of content items based on a user profile, wherein said content recommendation comprises at least one content item. A content item can e.g. be a piece of music, i.e. a song, a video, other multimedia data and/or everything for which a multi-media representation exists, e.g. wine or holidays. Thus, the database may be a music or video database. The user profile may be a predetermined user profile or be automatically adapted based on previous user behavior, e.g. user interaction with the system or user feedback. For example, the user profile could be based on an observation of what kind of content items the user has previously accessed, e.g. via downloading or streaming.

The method may further comprise determining a confidence measure for said content recommendation, said confidence measure being descriptive of an estimated, i.e. assumed quality of the determined content recommendation. For example, if the method/device proposes a content recommendation, e.g. a specific content item, to the user, than the confidence measure may be determined for this specific content item indicating the level of confidence that the user will like or dislike the respective content item. In an embodiment, it is also possible that a content item having a low confidence measure is deliberately determined as content recommendation (see below). The method may further comprise communicating, i.e. conveying, displaying or indicating the confidence measure or a derivative thereof to a user. The communicating may also be done via an acoustic output e.g. by a speech output or by outputting other sounds. When communicating the derivative of the confidence measure to a user, the user may not be informed about the exact value of the confidence measure, but, e.g. only if the confidence measure is high, i.e. the system is confident that the user will like the respective content recommendation, or low, i.e. the system is not confident that the user will like the respective content recommendation.

Communicating the confidence measure to the user may help to increase the user's understanding of the system and may subsequently increase the user's trust and acceptance of the system. This may also allow the introduction of "surprise recommendations". Such surprise recommendations may be recommendations that deliberately do not match the user profile and, thus, in general may have a low confidence measure. However, because the confidence measure is communicated to the user, the user may be made aware of this fact. For example, the system may display a sentence like the following to the user: "This is a surprise recommendation that does not exactly match your user profile." Thus, the user may be made aware of the fact that the current recommendation does not match his user profile in the best possible way. However, because the user is informed about this fact, the user may still accept the system's behavior.

Surprise recommendations can also be helpful for obtaining a more robust user profile because the user will be confronted with a content item he is normally, i.e. without surprise recommendations, not confronted with. The user may give feedback to such songs which can be very valuable information for determining a more robust, i.e. more profound or better, user profile. Surprise recommendations may also be used to make recommendations less boring and explore new areas, e.g. music of an area that was never played to the user before.

There exist many possibilities of determining the confidence measure. The confidence measure may e.g. be determined based on a matching score. In the following, an example is given of how the matching score may be determined.

For example, the user profile may indicate that the user likes songs having the following meta data attributes (meta data is data describing the content of a respective content item): pop, fast, romantic, 1990s. Thus, the user profile may be summarized as follows:

| User profile |
|---|
| Pop |
| Fast |
| Romantic |
| 1990s |

Based on the user profile, the matching score for different content items may be determined by comparing the meta data attributes of a respective song with the meta data attributes of the user profile. For example a first song may be a fast pop song of the 1990s. A second song may be a fast rock song of the 1980s. Thus, the matching score of the first song will be 3 and the matching score of the second song will be 1. This is illustrated in the following table:

| Meta data attribute | First song | Second song |
|---|---|---|
| Pop | + | − |
| Fast | + | + |
| Romantic | − | − |
| 1990s | + | − |
| Matching score: | 3 | 1 |
| Confidence measure: | high | low |

Thus, the confidence measure may be determined based on the matching score such that if the matching score has a high value, than the confidence measure also has a high value, whereas if the matching score has a low value, the confidence measure also has a low value.

Of course, a user profile may not need to contain only information about attributes or items the user liked, but also information about items he disliked (negative feedback). In general, no system would recommend items that have a high likelihood to be disliked. A user profile may e.g. contain the following information:
User likes: pop, slow, romantic, 1990s
User dislikes: punk, aggressive, 1980s
The database may comprise the following songs having the indicated attributes:
Song 1: pop, slow, melancholic, 1990s
Song 2: punk rock, fast, 1980s
Song 3: soul, slow, 1960s.

In this example, song 1 may be recommended with a high confidence, whereas song 2 will most likely never be recommended. Song 3 might be recommended with low confidence as a surprise recommendation since the system has no idea if the user likes 1960s and/soul music.

For computing the matching score, it would be possible to count all matching like attributes positive (incrementation) and subtract matching attributes labeled with "dislike" (negative feedback attributes).

In a further embodiment, the user may be inquired for user feedback for at least a part of said content recommendation, wherein the user feedback depends on the confidence measure. In this case, it may be sufficient to only inquire the user for user feedback once, wherein the type of query changes depending on the confidence measure.

According to a further embodiment, it is possible that the user feedback relates to meta data attributes of the content recommendation, said meta data attributes being descriptive of the content of a respective content item of the content recommendation.

In a further embodiment, it is also possible that if (or only if) the confidence measure is above a threshold and the user feedback indicates a disliking of the content recommendation, the user feedback may comprise feedback relating to the meta data attributes. For example, the system may recommend a pop song from the 1980s with strong guitars and a high male voice. If the confidence measure is high, e.g. lies above a threshold, there could e.g. be a plurality of buttons provided. For example, there could be one button being labeled "like" and a plurality of buttons relating to disliking, wherein the plurality of buttons could be labeled with "dislike because of strong guitars", "dislike because of type of voice" or "dislike at the moment". This way, if the confidence measure is high and the feedback indicates a disliking, the feedback relates to meta data attributes (see also FIG. 9A further explained below).

Still further, if the confidence measure is low, e.g. below a threshold, the user feedback may only indicate a liking or disliking of the content recommendation without being related to the meta data attributes (see also FIG. 9B further explained below). This may be useful, if the system has not been in use for a long time and further general feedback is necessary to better learn the user's behavior or preferences. Thus, if the confidence measure is low, e.g. the confidence measure is below a threshold, there may be only two buttons, one button labeled with "like" and one button with labeled "dislike".

Also, if the confidence measure is low, e.g. below a threshold, there could be multiple buttons having labels like e.g. "like because of 1980s", "like because of pop", "like because of the combination of 1980s and pop", "dislike because of 1980s", "dislike because of pop", and/or "dislike because of the combination of 1908s and pop". Thus, according to this embodiment shown in FIG. 9C and further explained below, the feedback may be related to meta data attributes if the confidence measure is low and the feedback indicates a liking or disliking of the content recommendation.

The method may also comprise receiving user feedback for at least a part of the content recommendation, inquiring the user for further user feedback, e.g. refined user feedback, depending on the confidence measure, and adapting the user profile based on the user feedback and/or the further user feedback. Thus, it may be possible to obtain further valuable feedback depending on the confidence measure. For example, if the confidence measure is high, e.g. above a certain threshold, this may indicate that the system is rather sure that the recommendation matches the user's taste. Therefore, the system may take the opportunity to ask the user e.g. what exactly the user likes about the song. For example, the user may be asked a question like "This is a romantic song. What type of romantic songs do you like: sweet romantic or soft romantic?". On the other hand, if the confidence measure is rather high, i.e. the system is rather sure that the recommendation matches the user's taste but the user feedback nevertheless indicates that the user does not like the song, the system may ask if the user does generally not like this recommendation or only at present. It is also possible that the system asks if the user generally does not like the genre, mood or era of the song.

In an embodiment, it is possible that said further feedback is refined, i.e. improved, advanced and/or enhanced user feedback relating to meta data attributes of the content recommendation. Meta data attributes refers to data describing a respective content item. For example, if the content items correspond to pieces of music, then meta data attributes may describe a piece of music with attributes such as e.g. slow/fast, romantic/rock and so on. The refined user feedback may indicate whether a user likes or dislikes certain sub-attributes of a main attribute of the content recommendation. For example, the recommendation may be a rock song. Then, the system may ask the user whether he likes slow rock or fast rock or rock of the 1990s/1980s and so on. In this way, refined user feedback may be obtained.

In a further embodiment, the user may be inquired for further user feedback only if the confidence measure is above a first threshold. The first threshold may be chosen to indicate a high estimated quality of the determined content recommendation. If the confidence measure is determined on a scale ranging from 0% to 100%, then the first threshold may be chosen to be equal to 50%, 60%, 70%, 80%, 90% or 95%. A typical value could be 70%.

In a further embodiment, if the user feedback indicates that the user dislikes the content recommendation and the further feedback indicates that the user generally likes the content recommendation but not at the moment, the user profile may not be adapted or may be adapted differently than normally, i.e. without further feedback. If no further feedback would be available, it can be very difficult to obtain a precise user profile. It is also possible that the further feedback indicates that the user generally likes the genre of a currently played song, but does not like a specific song. For example, the user may like pop songs, but not the song "Sorry" by Madonna, e.g. because he has negative feelings or memories of this particular song.

In a further embodiment, the confidence measure may be determined based on an estimated quality of the user profile.

The estimated quality of the user profile may be determined depending on the number of user interactions e.g. the number of times a user has given user feedback. The estimated quality may also be determined depending on the time the user has used the system or the number of songs the user has downloaded/listened to, i.e. accessed. Also, the estimated quality may be determined depending on the type of songs the user has downloaded or streamed. For example, if the user has downloaded many songs from the 2000s, then it may be assumed that the user is young and has high technical knowledge and enjoys giving feedback. Thus, it may be assumed that the estimated quality is high.

In a further embodiment, the estimated quality may be determined depending on the coherence of the user profile. The coherence refers to the overall sense or understandability of the user profile. Coherence may also refer to the logical interconnections, congruity or consistency of the user profile. In general, if the coherence is high, than the confidence measure may also be high. For example, a first user may consistently have rated fast songs of the 1950s with "like" and slow songs of the 2000s with "dislike". A second user may have rated some fast songs of the 1950s with "like" and some with "dislike". Further, the second user may have rated some slow songs from the 2000s with "like" and some with "dislike". In this example, the user profile of the first user would have a high coherence, because the user's ratings may be easily classified/explained by "The first user likes fast songs from the 1950s and dislikes slow songs from the 2000s". Contrary, the user profile of the second user has a low degree of coherence because it is more difficult to explain the strategy of ratings of the second user.

In a further embodiment, it may be possible to determine a virtual best matching content item based on the user profile, the virtual best matching content item matching all meta data attributes that the user has given feedback for as close as possible. "As close as possible" may mean that only attributes are considered for which the user has given positive feedback, since in general it is not intended to recommend items with a large number of negative feedback attributes. Thus, negative feedback attributes may not need to be considered.

I It may be possible to calculate a distance measure between a content item of the content recommendation and the virtual best matching content item, wherein the confidence measure is determined based on the distance measure. For example, if the user profile has the following content:

| Attribute | Probability of like |
| --- | --- |
| Slow | 80% |
| Romantic | 85% |
| Hardrock | 55% |
| 1990s | 60% |
| 1980s | 75% |
| 1970s | 20% |

This user profile would e.g. indicate that the respective user likes slow romantic songs of the 1990s or 1980s. A virtual best matching content item for this user would be a song labeled with: slow, romantic, hardrock, 1990s, and 1980s.

Thus, in order to determine a virtual best matching content item, e.g. a threshold is defined of e.g. 50% and attributes having a higher probability of like than the threshold are labeled with one, whereas attributes having a lower probability of like are labeled with zero. In the example, this would lead to a virtual best matching content item labeled as follows:

| | |
| --- | --- |
| Slow | 1 |
| Romantic | 1 |
| Hardrock | 1 |
| 1990s | 1 |
| 1980s | 1 |
| 1970s | 0 |

In a possible embodiment, if a song from a database is to be determined based on the virtual best matching content item, then it may be possible to only compare attributes of the song with the attributes labeled with "1" of the virtual best matching content item. Therefore, computation time may be reduced.

Further, it may be possible to allow the incorporation of new labels that have so far not been used in the database where the content items are stored. For example, a new label "melancholic" may be used that has so far not been used. In order to achieve a compatibility with an existing database and/or search algorithms and/or user profiles, it may be possible to create a reference database comprising an assignment between old and new labels. For example the new label "melancholic" may be assigned to attribute "romantic" that has already been used before.

It may also be possible to attribute matching values to the new labels. The matching values may describe a degree of similarity to the old labels (labels that have been used so far).

For example, the new label "melancholic" may be labeled with the following similarity values:

| | |
|---|---|
| Slow | 0.8 |
| Romantic | 0.4. |

In this example it is assumed that a melancholic song is general rather slow and in some cases romantic songs are melancholic. Of course, such values could be extracted from large musical databases automatically.

When matching a song with a new label, e.g. with the new label "melancholic", then, as described above, the concept of virtual best matching content item may help to save computational time, because no complex computations need to be performed that would be necessary when the probabilities of like or other measures stored together with a user profile would be used.

In a further embodiment, the method may comprise lighting a green light or displaying a green feedback button, if the confidence measure is above a first threshold value, and/or lighting a red light or displaying a red feedback button, if the confidence measure is below the first threshold. The first threshold may be chosen to be equal to 0.5. Thus, if the confidence measure is above 0.5 (=50%), then a green light may be lighted or displayed such that the user may quickly realize just by looking at the system/device that the system is confident about the recommendation. Thus, the user may have more confidence in a certain recommendation of the system.

A device for content recommendation may comprise a data processor adapted to determine a content recommendation from a database of content items based on a user profile, wherein the content recommendation comprises at least one content item, and further is adapted to determine a confidence measure for the content recommendation, wherein the confidence measure is descriptive of an estimated, i.e. assumed, quality of the determined content recommendation, and a display adapted to display the confidence measure or a derivate thereof to a user.

In an embodiment, the device may comprise at least one button or graphical user interface adapted to input user feedback for at least a part of said content recommendation, the button/graphical user interface further being adapted to input further user feedback, e.g. refined user feedback, depending on the confidence measure, wherein the data processor is further adapted to update the user profile based on the user feedback and/or the further user feedback.

In still another embodiment, the method for content recommendation may comprise determining a content recommendation from a database of content items based on a user profile, wherein the content recommendation comprises at least one content item, determining a confidence measure for the content recommendation, the confidence measure being descriptive of an estimated quality of the determined content recommendation, receiving user feedback for at least a part of the content recommendation, and inquiring the user for further user feedback depending on the confidence measure. Thus, according to this embodiment, further user feedback may only need to be input by the user, if e.g. the confidence measure is above a certain threshold. This may be used, e.g. for obtaining a refined user feedback and, thus, a more profound, i.e. refined or better user profile. In an embodiment, the user profile may be adapted based on the user feedback and/or the further user feedback.

A graphical user interface may also comprise a selectable positive feedback button associated with a first changeable text field, wherein the first changeable text field indicates that normal positive feedback can be input for a currently played content item, wherein, if normal positive feedback has been input and a confidence measure for the current played content item is above a threshold, the first changeable text field changes and indicates that the refined feedback can be input for the currently played content item.

In an embodiment, the selectable negative feedback button of the graphical user interface may upon selection cause a negative feedback to be output to a data processor of a device comprising the graphical user interface.

In a further embodiment, the device for content recommendation may comprise a receiver adapted to receive at least one piece of music and adapted to receive a confidence measure for the at least one piece of music, an acoustic output adapted to play the at least one piece of music, and a graphical user interface comprising a selectable positive feedback button associated with a first changeable text field, wherein the first changeable text field indicates that normal positive feedback can be input for a currently played content item, wherein, if normal positive feedback has been input and a confidence measure for the current played content item is above a threshold, the first changeable text field changes and indicates that the refined feedback can be input for the currently played content item.

In a further embodiment, the device for content recommendation may comprise a receiver adapted to receive at least one piece of music and adapted to receive a confidence measure for the at least one piece of music, an acoustic output adapted to play the at least one piece of music, and a display adapted to display a respective confidence measure of a currently played piece of music. In a further embodiment, the device may comprise at least one feedback button adapted to input user feedback for the currently played piece of music.

In a further embodiment, the device may comprise at least one button or graphical user interface adapted to input user feedback for said at least one piece of music, said button/graphical user interface further being adapted to input further user feedback depending on the respective confidence measure of the currently played piece of music, wherein a user profile is updated based on the user feedback and/or the further user feedback.

In a further embodiment, the device may display an icon associated with a positive feeling like e.g. a heart if the confidence measure of the currently played piece of music is high and an icon associated with a negative feeling like e.g. a skull if the confidence measure of the currently played piece of music is low. In a further embodiment, the device may comprise a receiver adapted to receive a piece of music and adapted to receive a confidence measure for the piece of music, an acoustic output adapted to play the piece of music, and a light emitting diode adapted to emit green light if the confidence measure is high and adapted to emit red light if the confidence measure is low.

Alternatively or additionally, it may also be possible to have three different icons, e.g. a smiley or heart for a high confidence measure "like", a skull for a high confidence measure for "dislike" (although such a content item may normally not be recommended), and a question mark or something indicating a surprise e.g. an avatar with an open mouth for a low confidence measure or unknown confidence measure.

In an embodiment of the device the light emitting diode is adapted to emit green light if the confidence measure is above a first threshold, red light if the confidence measure is below a second threshold and yellow light, if the confidence measure lies in between the first and second threshold.

FIG. 1 shows steps that may be performed within a method for content recommendation. In a first determining step S100, a content recommendation is determined from a database 102 of content items based on a user profile 104. In a second determining step S106, a confidence measure is determined for the content recommendation determined in the first determining step S100.

Then, in a communicating step S108, the confidence measure is communicated to a user. This may be done by displaying the confidence measure or a derivative to the user. It is also possible that the confidence measure be output acoustically to the user. For example, a certain preset sound may indicate to the user a high confidence measure, wherein another preset sound may indicate to the user that the confidence measure is low. In an embodiment, it may be possible, that the user sets the sound for high/low confidence measures him/herself.

Then, in a receiving step S110, user feedback may be received. The user feedback received in receiving step S110 may indicate whether the user likes or dislikes a currently played content item. The user feedback may be given on a gradual scale or binary, i.e. the only feedback values are "like" and "dislike".

Then, in step S112, it is checked whether the confidence measure determined in the second determining step S106, is above a threshold. If the confidence measure is not above the threshold, the user profile may be adapted directly in an adapting step S116 based on the user feedback received in receiving step S110.

If, however, the confidence measure is above the threshold, the system may inquire the user for further user feedback. Then, in adapting step S116, the user profile may be adapted based on the further feedback obtained in inquiring step S114 and/or based on the user feedback received in receiving step S110.

Figure 2:
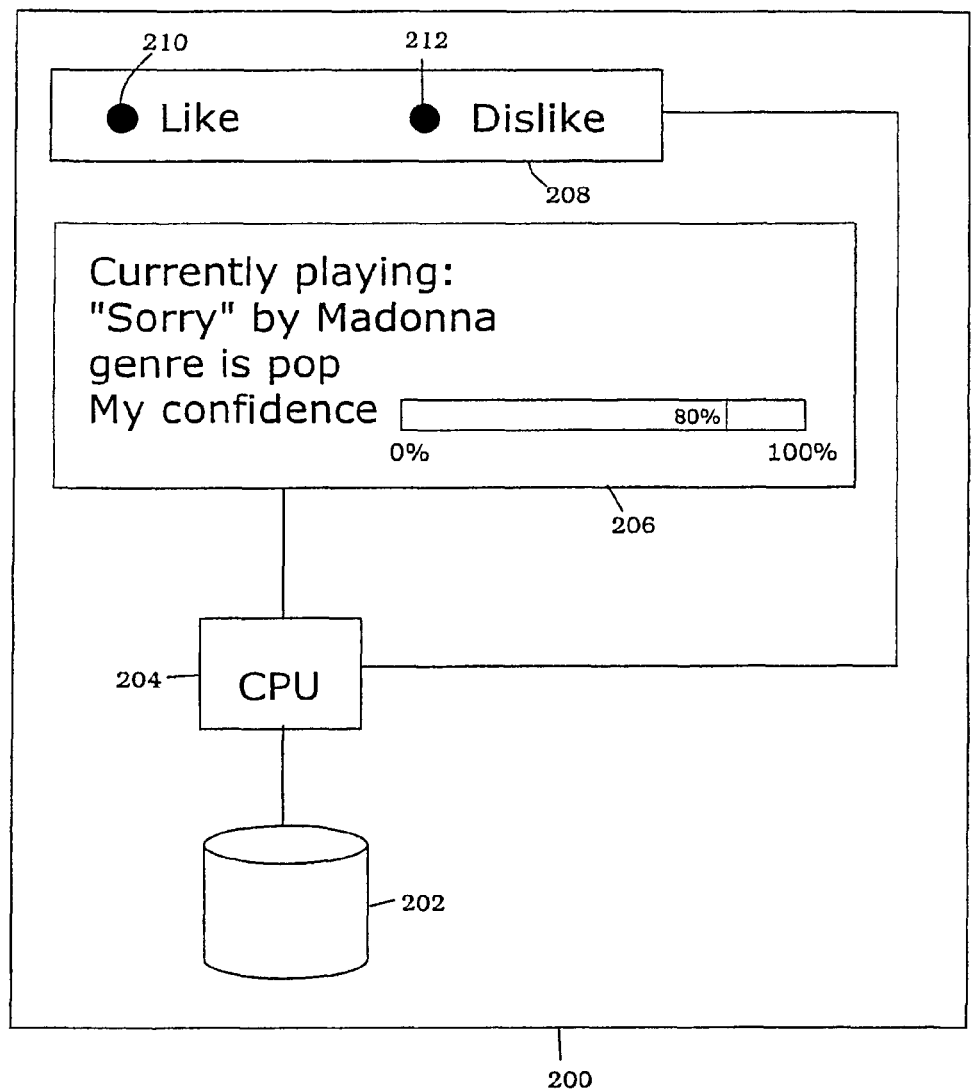
FIG. 2 shows an embodiment of a device for content recommendation.

FIG. 2 shows a device 200 comprising a database 202, central processing unit (CPU) 204, display 206 and feedback part 208. In the example of FIG. 2, display 206 displays what song is currently being played. In the example of FIG. 2, the song "Sorry" by Madonna is played. Further, it is displayed that the genre of this song is "pop". Still further, device 200 of FIG. 2 displays that the confidence for the currently played song "Sorry" is 80%. This means, that the system is rather sure (with a probability of 80%) that the user will like the song "Sorry".

The feedback part 208 enables the user to input feedback for the currently played song. The feedback part 208 comprises a like button 210 and a dislike button 212. By pressing the like button 210, the user may give feedback indicating that he likes the currently played song. On the other hand, if the user presses the dislike button 212, this indicates that the user does not like the currently played song.

In the example of FIG. 2, the user may have pressed the dislike button 212 although the confidence measure was high (80%).

Figure 3:
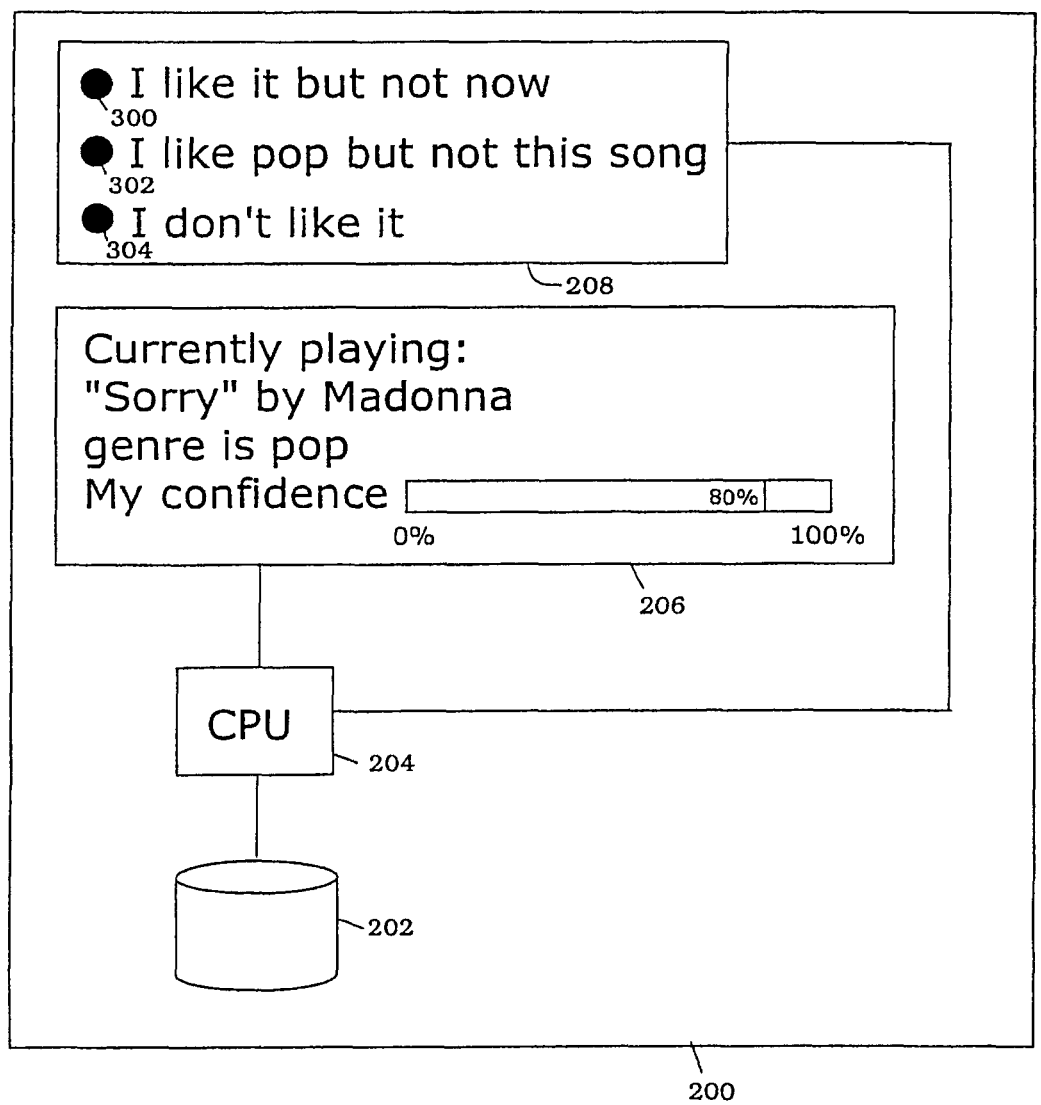
FIG. 3 shows a further embodiment of the device for content recommendation, wherein the user may input refined feedback.

FIG. 3 shows the device of FIG. 2 after having received the dislike rating. Upon entering the feedback, the feedback part 208 e.g. a graphical user interface may be changed. In the example of FIG. 3, three buttons 300, 302 and 304 may be displayed on feedback part 208. Each button may have an associated text field. In the example of FIG. 3, the first button 300 is associated with the text field indicating the text "I like it but not now". Further, the text field of the second button 302 indicates the text "I like pop, but not this song". Further, the text of the third button 304 is "I don't like it". By selecting/pressing one of buttons 300, 302 or 304, the user may input refined feedback, i.e. further feedback, for the currently played song "Sorry". This refined feedback may then be used for adapting the user profile.

Figure 4:
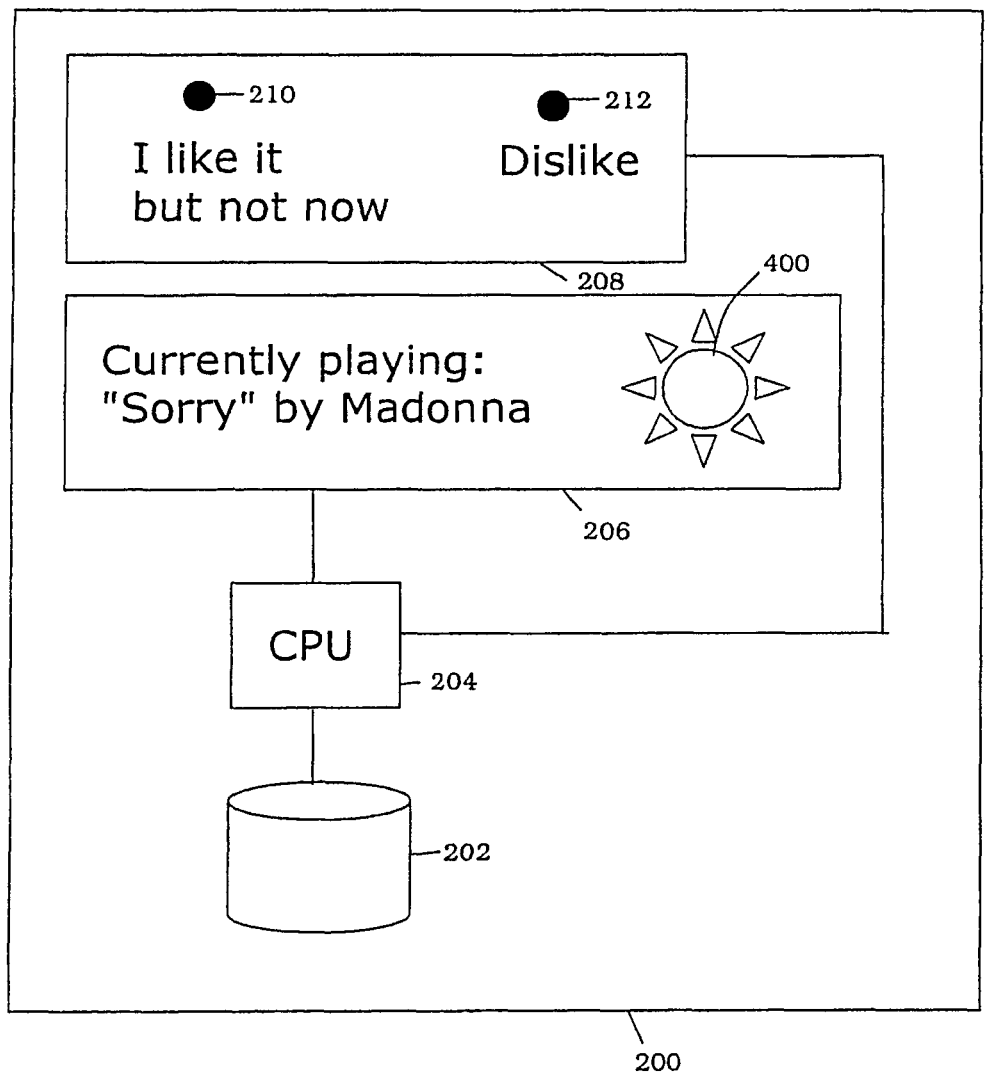
FIG. 4 shows still a further embodiment of the device for content recommendation.

FIG. 4 shows a further embodiment of the device of FIG. 2 after having received the dislike rating. In this embodiment, after the user has either input a like rating or dislike rating by pressing the like button 210 or dislike button 212, the feedback part 208 changes, wherein the text associated with like button 210 and/or dislike button 212 changes. In the embodiment shown in FIG. 4, the text field associated with the like button 210 changes from "like" (see FIG. 2) to "I like it but not now" in FIG. 4.

If the user presses button 210, the system receives feedback indicating that the user generally likes the currently played song, in the example "Sorry", but not at the moment. Thus, the system may skip the currently played song "Sorry", however, no negative feedback value will be associated with the song or its meta data attributes, i.e. the user profile is adapted differently.

In the embodiment of FIG. 4, on display 206, the confidence measure is not displayed by a value but by a green field 400. If the confidence measure is low for a currently played song, e.g. below 50%, then field 400 may change its color from green to red. Thus, the user may be informed about the confidence measure simply by noting the color of field 400.

Figure 5:
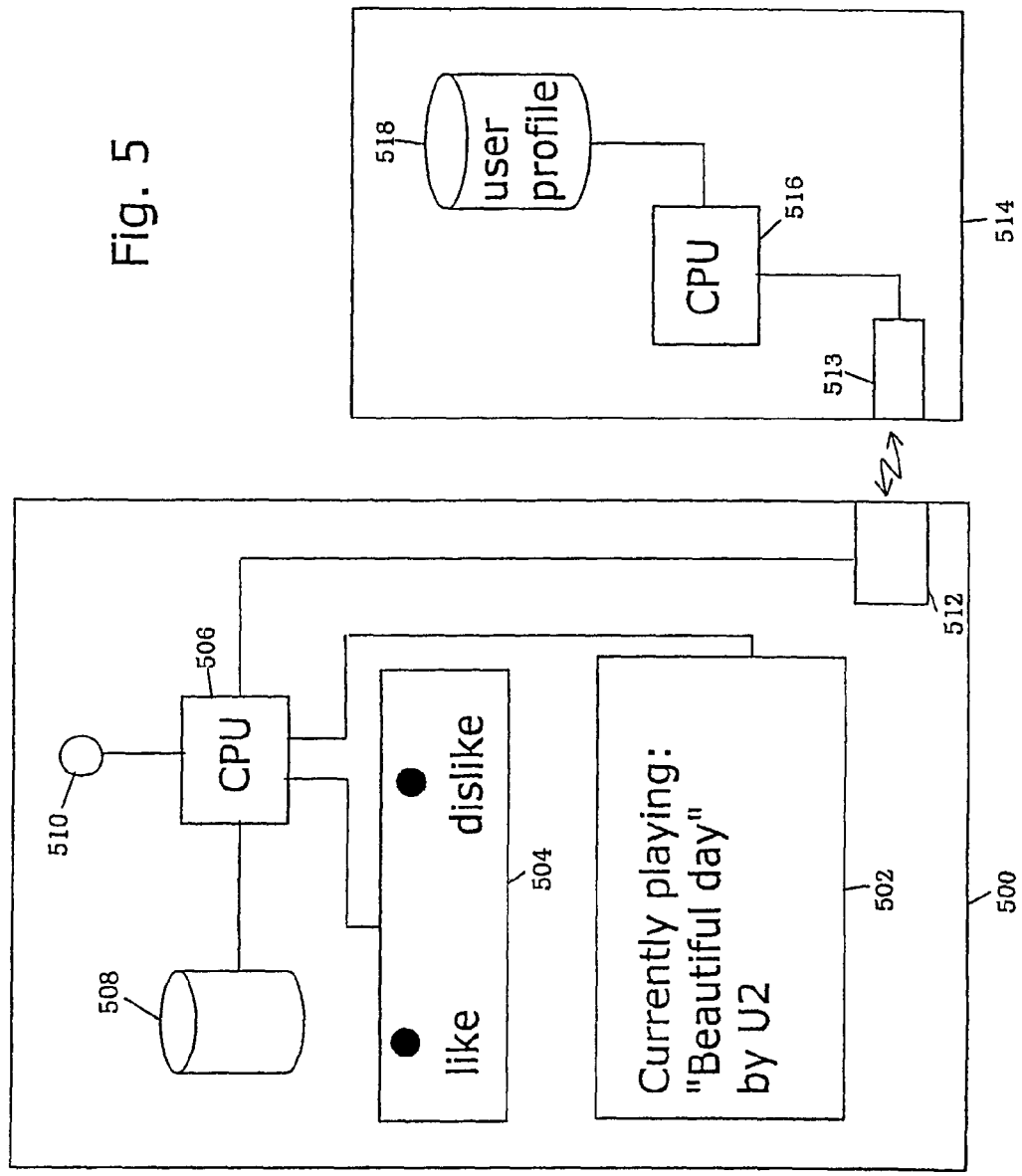
FIG. 5 shows still a further embodiment of the device for content recommendation.

FIG. 5 shows still another embodiment of a device 500 for content recommendation. The device 500 comprises a display 502, a feedback part 504, a central processing unit (CPU) 506, a data storage 508, a colored diode 510 and a receiver/transmitter 512. In the example of FIG. 5, device 500 currently plays the song "Beautiful day" by U2. On feedback part 504, the user can rate the song "Beautiful day" by pressing a like or dislike button. The colored diode 510 may change its color from red to yellow or to green. The colored diode may emit green light if a confidence measure for the currently played song is above a first threshold. If the confidence measure is below a second threshold, the colored diode may be controlled by the CPU 506 to emit red light. If the confidence measure lies in between the first and second threshold, the colored diode 510 may be controlled by CPU 506 to emit yellow light.

In the embodiment of FIG. 5, receiver/transmitter 512 may be adapted to communicate with a receiver/transmitter 513 of a server 514. In addition to the receiver/transmitter 513, the server 514 may comprise a CPU 516 and data storage 518. The data storage 518 may e.g. store a user profile. In the embodiment of FIG. 5, device 500 may be a mobile device and, after the user has input feedback on feedback part 504, the feedback may be transmitted to server 514. The CPU 516 of server 514 may use the received user feedback to adapt the user profile stored in data storage 518. Further, in the embodiment of FIG. 5 it is possible that server 514 determines the confidence measure and transmits it to device 500 which in turn displays the confidence measure via diode 510. Thus, processing power of device 500 can be low because the confidence measure is determined at server 514. Of course, in another embodiment, it is also possible that device 500 would determine the confidence measure.

Figure 6:
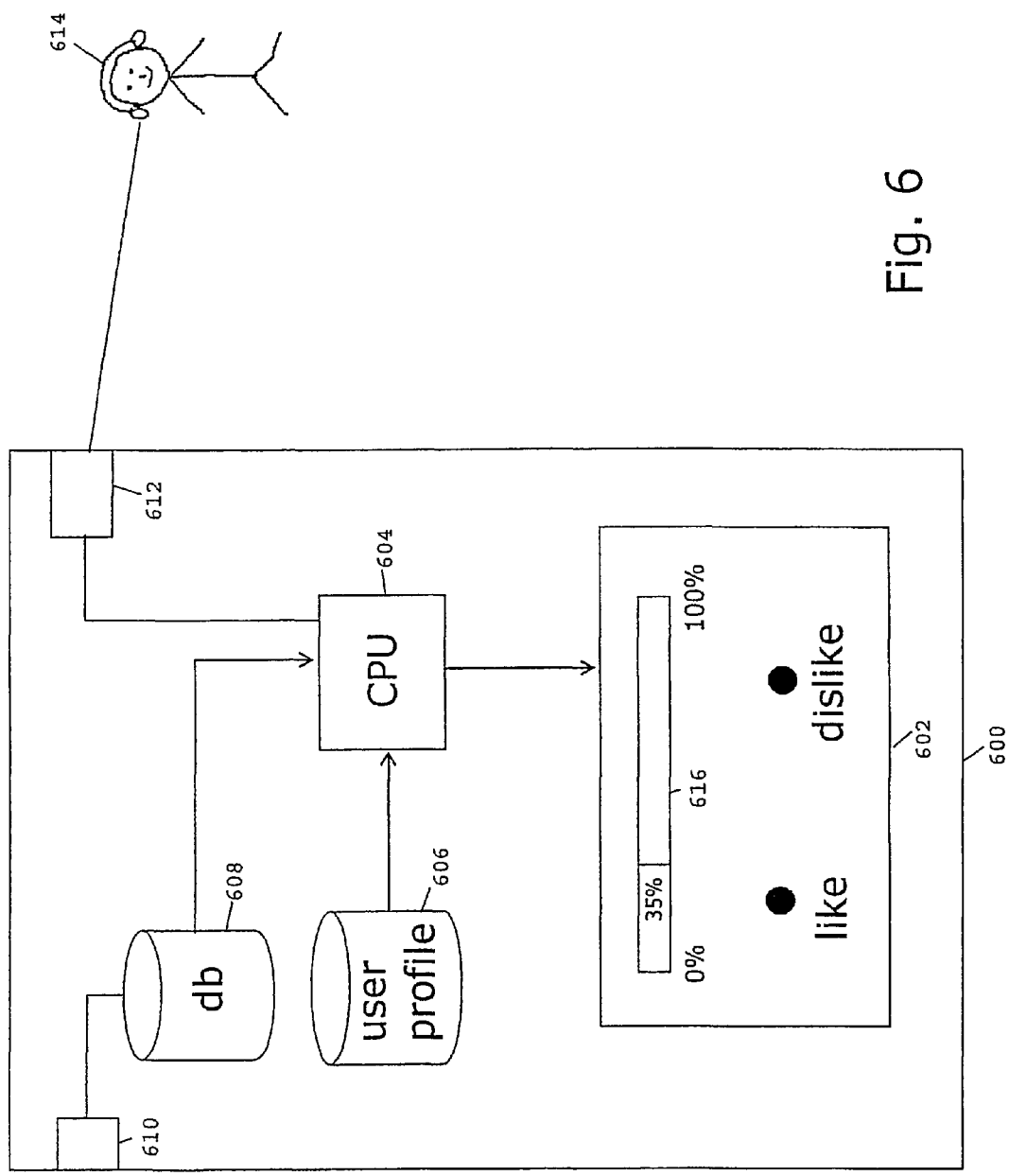
FIG. 6 shows still a further embodiment of the device for content recommendation.

FIG. 6 shows a handheld device 600 comprising a database 608 with stored songs. These songs of database 608 may have been uploaded onto mobile device 600 by the user via a bus interface 610. The bus interface 610 may operate, e.g. according to the universal serial bus (USB) standard or according to the IEEE 1394 standard or also the a wireless standard. Central processing unit 604 may determine a recommendation, e.g. a song from database 608 based on user profile 606. Further, on display 602, the confidence measure may be indicated and a like and dislike button may be provided. Thus, display 602 may comprise a graphical user interface comprising selectable buttons, i.e. a like button and a dislike button.

Audio data corresponding to the recommendation may be output as an audio signal to e.g. headphones 614 of a user via an audio output interface 612.

Display 602 further may comprise a bar 616 indicating the confidence measure for a currently played song. Thus, the user may be informed about the confidence the system has determined for the currently played song.

In a further embodiment, it is also possible that display 602 displays a whole list of content items and the user can give feedback for the whole list. Further, in this case, the confidence measure could indicate the confidence of the system for the whole list of content items.

FIG. 7 shows an example comparing the ratings of a first user and a second user. The first user has a user profile with a low coherence and the second user has a user profile with a high coherence.

Figure 7A:
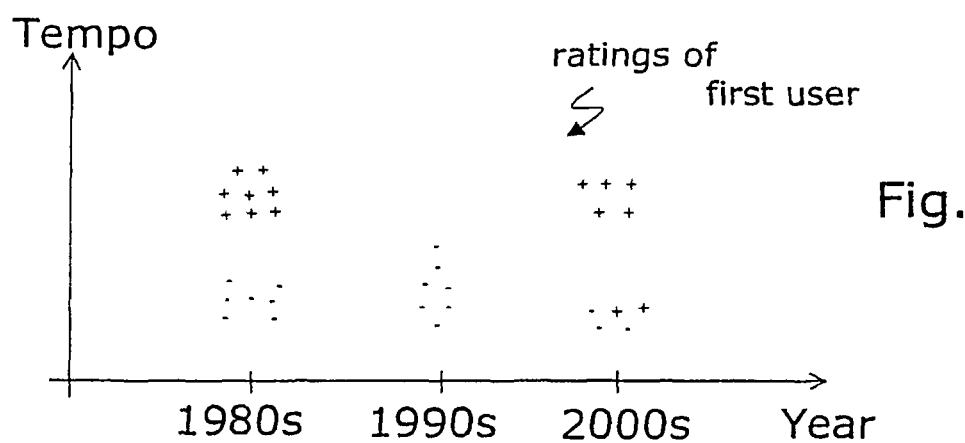
FIG. 7 shows diagrams for elucidating how the coherence may be determined.

FIG. 7A shows the ratings of the first user. The diagram shown in FIG. 7A shows the ratings of different content items of different years and different tempo, e.g. measured in beats per minute. Positive ratings are denoted by a "+" sign and negative ratings with a "−" sign. As may be seen in FIG. 7A, the user has rated fast songs of the 1980s with like and slow songs of the 1980s with dislike. Further, the user has rated all songs of the 1990s with dislike. Still further, the first user has rated some songs of the 2000s having a low tempo with like or dislike and fast songs of the 2000s with like.

Figure 7B:
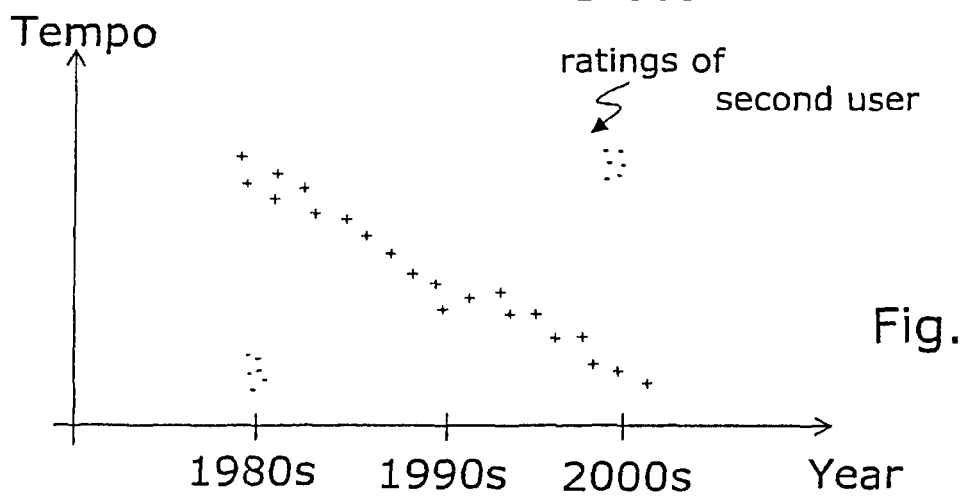

On the other hand, as seen in FIG. 7B, the second user has rated slow songs of the 1980s with dislike and fast songs of the 1980s with like. Further, the second user has rated songs of medium tempo of the 1990s with like. Still further, the second user has rated slow songs of the 2000s with like and fast songs of the 2000s with dislike.

Thus, the ratings of the second user may be simply explained by a statement like "As newer a content item the slower the content item". The ratings of the first user, however, is much more difficult to explain.

Figure 7C:
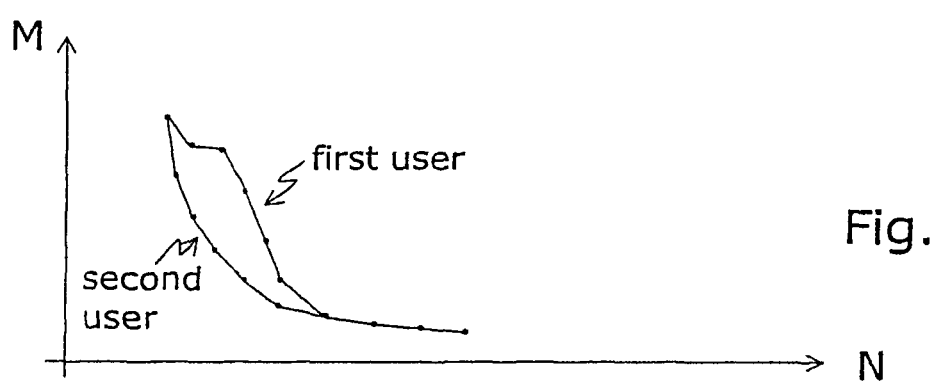

FIG. 7C shows a graph for the first user and a graph for the second user. The graphs of FIG. 7C show the number N of sub-profiles and the sum of matching scores M for the first and second user.

As may be seen from FIG. 7C, the sum of matching scores M decreases faster for the second user with rising number N of sub-profiles. This indicates a higher degree of coherence for the second user than for the first user.

Figure 8:
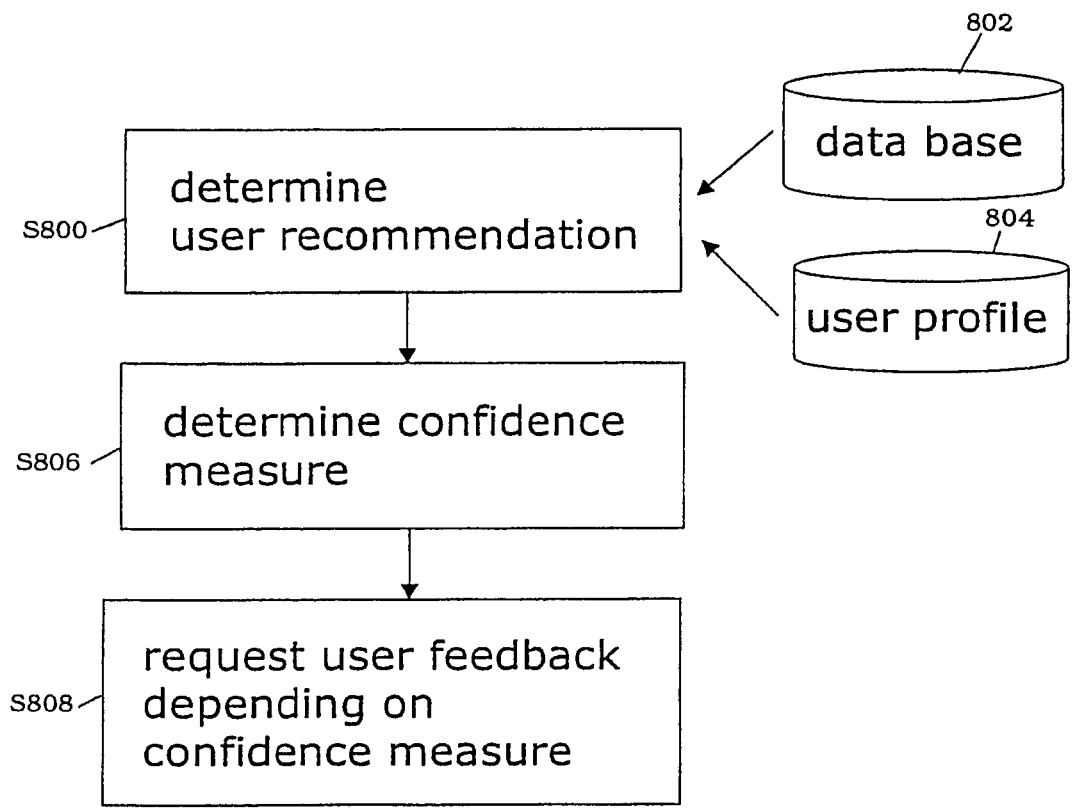
FIG. 8 shows steps of a further embodiment of the invention.

FIG. 8 shows a further embodiment of the invention, wherein, in a first step S800, a content recommendation is determined from a database 802 of content items based on a user profile 804. The content recommendation may comprise at least one content item.

In step 806, a confidence measure is determined for the content recommendation determined in step S800. The confidence measure is descriptive of an estimated quality of the determined content recommendation.

In step S808, user feedback is requested depending on the confidence measure. Thereby, it is possible that e.g. a graphical user interface is modified depending on the confidence measure. For example, depending on the confidence measure, a number of feedback buttons and/or labels of the buttons may be changed. This way, the user is enabled to input different feedback e.g. relating to meta data attributes of the content recommendation.

FIG. 9 shows different examples, wherein the user is enabled to input different user feedback depending on the confidence value.

In FIG. 9, the system may have recommended a pop song of the 1980s with strong guitars and high male voice.

Figure 9A:
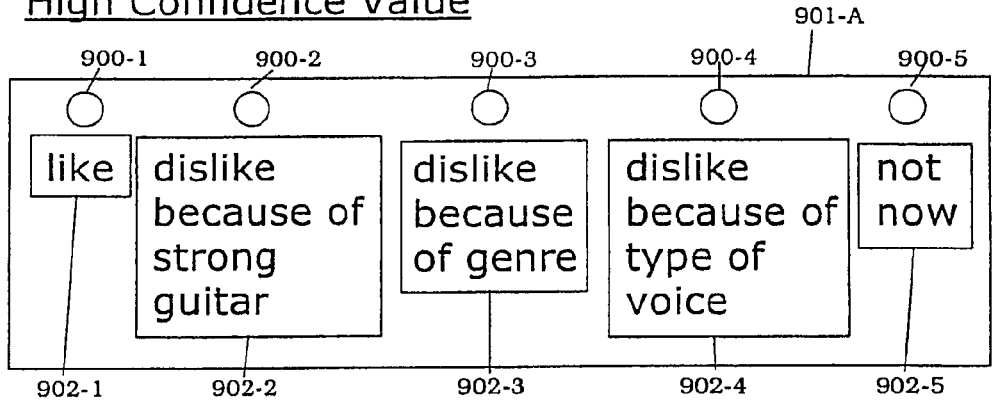
FIG. 9 shows different types of user feedback depending on a confidence measure.

If the confidence measure is high, e.g. the confidence measure is above a threshold, a graphical user interface 901-A or other feedback means may have a form as shown in FIG. 9A. As seen in FIG. 9A, there is a plurality of buttons 900-1, 900-2, 900-3, 900-4, 900-5 provided allowing the user to input different kind of feedback. Each of buttons 900-1 to 900-5 is labeled with a different kind of label 902-1, 902-2, 902-3, 902-4, 902-5 indicating the respective following types of feedback: "like" (902-1), "dislike because of strong guitar" (902-2), "dislike because of genre" (902-3), "dislike because of type of voice" (902-4), "like but not now" (902-5).

Figure 9B:
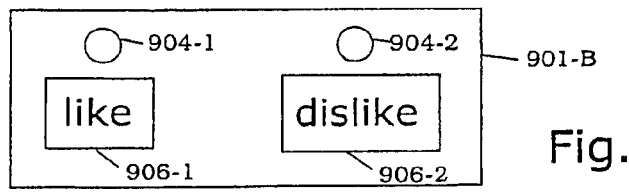

FIG. 9B shows a graphical user interface 901-B in case of a low confidence measure, i.e. a confidence measure below a threshold. As seen, graphical user interface 901-B only has two buttons, a first button 904-1 labeled with label 906-1 "like" and a second button 904-2 with label 906-2 "dislike".

Figure 9C:
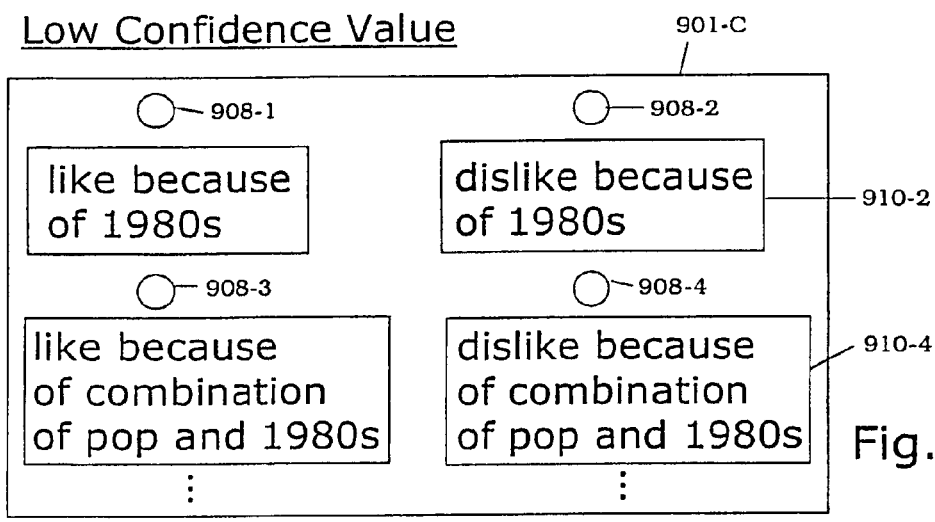

Alternatively, if the confidence measure is low, as shown in FIG. 9C, there may be provided a plurality of feedback buttons 908-1, 908-2, . . . having respective labels 910-1, 910-2. The labels of the buttons may e.g. say something like: "like because of 1980s", "like because of pop", "like because of the combination of 1980s and pop", "dislike because of 1980s", "dislike because of pop", "dislike because of the combination of 1980s and pop".

Thus, FIG. 9 shows that it is possible that, if the system has a high confidence with respect to a broad classification, e.g. 1980s/pop of a content recommendation, the system may ask for more detailed feedback regarding more specific features, i.e. meta data attributes, such as e.g. the type of instrumentation or type of voice. If the system does not yet have a good model of the user's taste, detailed categories, i.e. detailed meta data attributes, may not be helpful, and, therefore, the system may only ask for feedback for broad, i.e. higher level categories/meta data attributes.

The following elucidations may help a person skilled in the art to get a broader understanding:

The confidence indicator confidence measure may increase the trust of a user into the system. If e.g. not much data has been obtained about the user's preferences, the system basically has to guess what content items the user may like. The confidence indicator will show this and so the user can see that the system is not really making errors but simply does not yet have enough data to recommend suitable content items. If the user continues to interact with the system, the recommendations will get better which may be indicated by increasing confidence measures. Without a confidence indicator, the user is more likely to be put off, i.e. disappointed, by early recommendations that might not be very good, because he thinks the system generally does not work.

The confidence indicator may also be used to deliberately introduce "surprise recommendations" that do not match the user profile very well. This may be used to avoid boredom caused by to many similar recommendations. Without a confidence indicator, such surprise recommendations will seem like errors to the user. However, by displaying the confidence measure, i.e. by using a confidence indicator, the user may immediately see that a certain recommendation is a surprise recommendation and may decide that he wants to explore something new.

The confidence indicator may be an addition to any basic system that automatically generates recommendation based on a user profile. The recommendation may concern any type of content item including but not limited to music, books, TV and video content, holiday trips and/or the like. The recommendations may be based on any sort of feature, e.g. text-data from web pages or electronic program guides for television and video content or automatically generated features based on signal processing methods for e.g. music similarity. The features themselves do not have to be meaningful to the user. The user profile may be obtained in multiple ways, including direct feedback from the user in the form of liked or disliked items, general preferences and interests or social background given by the user or indirect feedback in the form of observations of user behavior. Indirect feedback may e.g. be based on the time the user listened to e.g. a song. The recommendation may be made using any type of suitable techniques, such as collaborative filtering or machine learning or pattern matching algorithms.

All of the above mentioned approaches for content recommendation may be based on a user profile and a matching algorithm. This means that a matching score may be obtained for any recommended item automatically. It is also possible to obtain a measure about the quality of the user profile based on e.g. the number of user interactions, e.g. ratings or downloaded/accessed content items, songs listened to and so on. It may also be possible to additionally obtain a measure about the coherence of the user's choices, and the more coherent the choices are, the higher the confidence of a new recommendation will be, even if only a small number of user interactions exist. For example, a user may have a high coherence if all holidays booked are in Spain near the coast in three star hotels.

It is also possible to hypothesize a virtual best matching content item which matches the user profile exactly. The difference in score between this virtual "ideal" item and any real recommended item may indicate the confidence of the system into the recommendation, i.e. the smaller the difference, the higher the confidence. This confidence may be optionally be weighted by the "quality" of the current user profile.

The confidence of the system regarding a specific recommendation may be made known to the user in an intuitive and easily understandable way. This may be done using for example graphical items that vary in color e.g. graphic light colors: green for items with a high confidence value, orange or yellow for medium values, red for items with low confidence. Graphical items may also change their form, e.g. heart shapes contra skull shapes and/or the size e.g. the larger the button, the higher the confidence value.

What is claimed is:

1. A device for content recommendation, comprising:
a receiver configured to receive data to play at least one song;
a non-transitory medium to store at least a portion of the data to play the at least one song;
an acoustic output configured to play the at least one song; and
a feedback part to input user feedback with respect to an attribute of the at least one song,
wherein said feedback part includes at least one button or a graphical user interface portion to input said user feedback for the at least one song,
wherein said attribute of the at least one song is defined by at least one of the group consisting of a tempo, a mood, and an era, and
wherein the at least one button or the graphical user interface portion to input said user feedback for the at least one song changes in appearance responsive to an electronically determined confidence measure of the user with respect to the at least one song.

2. The device according to claim 1, wherein a user profile is updated based on said user feedback.

3. The device according to claim 2, wherein said receiver is a transceiver to transmit said user feedback to a server that updates said user profile based on said user feedback.

4. The device according to claim 1, wherein said feedback part inputs further feedback based on the electronically determined confidence measure of the at least one song, the electronically determined confidence measure being descriptive of an estimated quality of the at least one song, the quality being estimated based on a user profile.

5. The device according to claim 1, wherein an icon associated with a positive result or feeling is displayed in response to the electronically determined confidence measure of the at least one song being high as compared to a predetermined confidence level threshold, and an icon associated with a negative result or feeling is displayed in response to the electronically determined confidence measure of the at least one song being low as compared to the predetermined confidence level threshold, the electronically determined confidence measure being descriptive of an estimated quality of the at least one song, the quality being estimated on the basis of a user profile.

6. The device according to claim 1, wherein the feedback part further includes a field or light emitting diode that emits green light in response to the electronically determined confidence measure being high, and emits red light in response to the electronically determined confidence measure being low, the electronically determined confidence measure being descriptive of an estimated quality of the at least one song, the quality being estimated on the basis of a user profile.

7. The device according to claim 6, wherein
said field or light emitting diode emits
green light in response to the electronically determined confidence measure being above a first threshold,
red light in response to the electronically determined confidence measure being below a second threshold, and
yellow light in response to the electronically determined confidence measure being between said first and second thresholds.

8. The device according to claim 1, wherein the device is a mobile device.

9. The device according to claim 1, wherein an appearance of the feedback part changes for different songs.

10. The device according to claim 1, wherein an appearance of the feedback part changes based on an attribute of the song.

11. The device according to claim 1, wherein an appearance of the feedback part changes based on user input to said feedback part regarding one of the at least one songs being output by said acoustic output, the appearance of the feedback part being changed to receive redefined feedback information from the user via user input to said feedback part.

12. A device for content recommendation, comprising:
a receiver that is configured to receive at least one piece of music and a confidence measure for said at least one piece of music, said confidence measure being descriptive of an estimated quality of the at least one piece of music, the quality being estimated on the basis of a user profile of a user;
a non-transitory medium that stores at least a portion of the at least one piece of music;
an acoustic output that is configured to play said at least one piece of music;
a display that is configured to display the confidence measure of the currently played piece of music; and
a feedback part that inputs user feedback for said currently played piece of music, wherein said feedback part includes at least one button or graphical user interface that inputs said user feedback for said at least one piece of music, said graphical user interface includes a selectable positive feedback button associated with a first changeable text field, said first changeable text field indicating that normal positive feedback can be input for a currently played piece of music, and in response to the normal positive feedback having been input and said confidence measure being above a threshold, the first changeable text field changes and indicates that refined feedback can be input for the currently played piece of music.

13. A server, comprising:
data processing circuitry configured to determine at least one song based on a user profile;
a non-transitory medium to store the user profile; and
a transceiver configured to receive user feedback with respect to an attribute of the at least one song,
wherein said attribute of the at least one song is defined by at least one of the group consisting of a tempo, a mood, and an era, and
wherein the user feedback is provided by user input to a portion of a graphical user interface that changes appearance responsive to an electronically determined confidence measure of the user with respect to the at least one song.

14. The server according to claim 13, wherein the data processing circuitry adapts the user profile based on the user feedback.

15. The server according to claim 14, wherein the data processing circuitry determines the electronically determined confidence measure for the at least one song based on the user profile, the electronically determined confidence measure being descriptive of an estimated quality of the at least one song, the quality being estimated on the basis of the user profile.

16. A system, comprising:
a device for content recommendation, including:
a receiver configured to receive data regarding at least one song,
an acoustic output configured to play the at least one song, and
a feedback part to input user feedback with respect to an attribute of the at least one song, said feedback part including at least one button or a graphical user interface portion to input said user feedback for the at least one song, and said attribute of the at least one song being defined by at least one of the group consisting of a tempo, a mood, and an era, and the at least one button or the graphical user interface portion to input said user feedback for the at least one song changes appearance responsive to an electronically determined confidence measure of the user with respect to the at least one song; and
a server including:
data processing circuitry configured to determine the at least one song,
a non-transitory medium to store the data regarding the at least one song, and
a transceiver configured to receive the user feedback.

17. A device for content recommendation, comprising:
a receiver configured to receive data regarding at least one song;
a non-transitory medium to store at least a portion of the data regarding the at least one song;
an acoustic output configured to play the at least one song; and a feedback part that inputs to input user feedback with respect to an attribute of the at least one song,
wherein said feedback part includes at least one button or a graphical user interface portion to input said user feedback for the at least one song,
wherein said attribute of the at least one song is defined by at least one of the group consisting of a tempo, a mood, and an era, and
wherein the at least one button or the graphical user interface portion to input said user feedback for the at least one song changes in appearance responsive to an electronically determined confidence measure of the user with respect to the at least one song.

18. The device according to claim 17, wherein said receiver is a transceiver configured to transmit said user feedback to a server, which is configured to update a user profile based on said user feedback.

19. The device according to claim 17, wherein said user feedback part inputs further feedback based on the electronically determined confidence measure of the at least one song, the electronically determined confidence measure being descriptive of an estimated quality of the at least one song, the quality being estimated on the basis of a user profile.

20. A device for content recommendation, comprising:
a receiver that is configured to receive at least one piece of music and a confidence measure for said at least one piece of music from a server;
a non-transitory medium that stores at least a portion of said at least one piece of music;
an acoustic output that is configured to play said at least one piece of music;
a display that is configured to display the confidence measure of the currently played piece of music; and
a feedback part that inputs user feedback for said currently played piece of music, wherein said feedback part includes at least one button or graphical user interface that inputs said user feedback for said at least one piece of music,
said graphical user interface includes a selectable positive feedback button associated with a first changeable text field, said first changeable text field indicating that normal positive feedback can be input for the currently played piece of music, and
in response to the normal positive feedback having been input and said confidence measure being above a threshold, the first changeable text field changes and indicates that refined feedback can be input for the currently played piece of music.

21. A device for content recommendation, comprising:
a receiver that receives data regarding at least one song;
a non-transitory medium that stores at least a portion of the data regarding the at least one song;
an acoustic output that plays the at least one song; and
a graphical user interface that inputs user feedback related to an attribute of the at least one song, said attribute of the at least one song being defined by at least one of the group consisting of a tempo, a mood, and an era, and the graphical user interface being configured to be modified to input the feedback related to the attribute, the modification including a change in appearance to a user-feedback input portion of the graphical user interface responsive to an electronically determined confidence measure of the user with respect to the at least one song.

22. A device for content recommendation, comprising:
a receiver that receives at least one piece of music and a confidence measure for said at least one piece of music from a server;

a non-transitory medium that stores at least a portion of said at least one piece of music;

an acoustic output that plays said at least one piece of music;

a display that displays a respective confidence measure of a currently played piece of music; and a graphical user interface that inputs user feedback for said at least one piece of music, the graphical user interface being configured to be modified depending on the confidence measure, wherein said graphical user interface includes a selectable positive feedback button associated with a first changeable text field, said first changeable text field indicating that normal positive feedback can be input for the currently played piece of music, and in response to the normal positive feedback having been input and said confidence measure being above a threshold, the first changeable text field changes and indicates that refined feedback can be input for the currently played piece of music.

23. A device for content recommendation, comprising:

a receiver that receives data regarding at least one song;

a non-transitory medium that stores at least a portion of the data regarding the at least one song;

an acoustic output that plays the at least one song;

a display that displays a list of songs; and a feedback part that inputs user feedback with respect to an attribute of each of the songs of the whole list of songs, said attribute of the at one song being defined by at least one of the group consisting of a tempo, a mood, and an era, wherein said feedback part includes a graphical user interface portion that inputs said user feedback for each of the songs of the whole list of songs, wherein the graphical user interface portion changes in appearance responsive to an electronically determined confidence measure of the user with respect to at least one song of the list of songs, and wherein the device is configured to provide a surprise recommendation of a song when an electronically determined confidence measure of the user for the song associated with the surprise recommendation is below a threshold confidence measure associated with the user.

24. A device for content recommendation, comprising:

a receiver that receives data regarding at least one song;

a non-transitory medium that stores at least a portion of the data regarding the at least one song;

an acoustic output that plays the at least one song; and a graphical user interface that inputs user feedback for the at least one song, the graphical user interface being configured to change to input feedback related to an attribute of the at least one song, wherein the at least one song is a surprise recommendation based on a confidence measure of the user with respect to the at least one song being below a threshold confidence measure associated with the user.

25. A device for content recommendation, comprising:

a receiver that receives at least one piece of music and a confidence measure for said at least one piece of music;

a non-transitory medium that stores at least a portion of said at least one piece of music;

an acoustic output that plays said at least one piece of music;

a display that displays the confidence measure of the currently played piece of music; and a graphical user interface that inputs a user feedback for said at least one piece of music, the graphical user interface being configured to change upon entering the feedback to input further feedback for the currently played piece of music, wherein said graphical user interface includes a selectable positive feedback button associated with a first changeable text field, said first changeable text field indicating that normal positive feedback can be input for a currently played piece of music, and in response to the normal positive feedback having been input and said confidence measure being above a threshold, the first changeable text field changes and indicates that refined feedback can be input for the currently played piece of music.

* * * * *